United States Patent
Lederer

(10) Patent No.: US 10,831,365 B2
(45) Date of Patent: Nov. 10, 2020

(54) METHOD FOR CONTROLLING A DISPLAY DEVICE AT THE EDGE OF AN INFORMATION ELEMENT TO BE DISPLAYED

(71) Applicant: Unify GmbH & Co. KG, Munich (DE)

(72) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 574 days.

(21) Appl. No.: 15/123,113

(22) PCT Filed: Mar. 6, 2014

(86) PCT No.: PCT/EP2014/000583
§ 371 (c)(1),
(2) Date: Sep. 1, 2016

(87) PCT Pub. No.: WO2015/131917
PCT Pub. Date: Sep. 11, 2015

(65) Prior Publication Data
US 2017/0075560 A1    Mar. 16, 2017

(51) Int. Cl.
*G06F 3/0488* (2013.01)
*G06F 3/0485* (2013.01)

(52) U.S. Cl.
CPC ........ *G06F 3/04883* (2013.01); *G06F 3/0485* (2013.01); *G06F 3/04886* (2013.01)

(58) Field of Classification Search
CPC .................................................. G06F 3/0485
See application file for complete search history.

(56) References Cited

U.S. PATENT DOCUMENTS 6,323,846 B1 * 11/2001 Westerman ........... G06F 3/0235
345/173
2008/0178115 A1    7/2008 Yokota
(Continued)

FOREIGN PATENT DOCUMENTS

CN       102027464 A    4/2011
CN       103180807 A    6/2013
(Continued)

OTHER PUBLICATIONS

Written Opinion of the International Searching Authority for PCT/EP2014/000583 dated Jun. 23, 2014 (Form PCT/ISA/237).
(Continued)

*Primary Examiner* — Mandrita Brahmachari
(74) *Attorney, Agent, or Firm* — Buchanan Ingersoll & Rooney PC

(57) ABSTRACT

The invention relates to a device and a method for controlling a display device such that a section of an information element presented on the display device, where a first edge is not presented, a first edge section is presented that comprises the first edge of the information element as well as the region of the information element that is adjacent to the first edge, having the step of executing a translation of the presented section of the information element in a first direction according a to control motion executed by a user and triggering a first control signal for the translation in a second direction, wherein the first control signal is supplied to a control device, characterized by the steps such that a second control signal is generated and supplied to the control device as soon as the control motion has reached the second edge of the display device having been reached by the motion in the second direction, jumping to present the first edge section of the information element on the display device reached by the motion in the first direction.

20 Claims, 6 Drawing Sheets

(56) References Cited

U.S. PATENT DOCUMENTS

| | | | |
|---|---|---|---|
| 2009/0278806 A1 | 11/2009 | Duarte et al. | |
| 2011/0093812 A1 | 4/2011 | Fong | |
| 2011/0187657 A1 | 8/2011 | Knowles | |
| 2013/0222274 A1* | 8/2013 | Mori | B60K 37/06 345/173 |
| 2013/0346915 A1* | 12/2013 | Kuehnle | G06F 3/0482 715/799 |

FOREIGN PATENT DOCUMENTS

| | | |
|---|---|---|
| EP | 2184671 A1 | 5/2010 |
| TW | 201214237 A | 4/2012 |
| TW | 201329846 A | 7/2013 |
| TW | 201335799 A | 9/2013 |
| WO | 2013192254 A2 | 12/2013 |

OTHER PUBLICATIONS

International Search Report for PCT/EP2014/000583 dated Jun. 23, 2014 (Form PCT/ISA/210).
Taiwanese Search Report for Taiwan Patent Application Serial No. 104106763 dated Mar. 31, 2016.

* cited by examiner

METHOD FOR CONTROLLING A DISPLAY DEVICE AT THE EDGE OF AN INFORMATION ELEMENT TO BE DISPLAYED

CROSS REFERENCE TO RELATED APPLICATIONS

This application is the United States national stage under 35 U.S.C. § 371 of PCT International Patent Application No. PCT/EP2014/000583, filed on Mar. 6, 2014.

BACKGROUND OF THE INVENTION

Field of the Invention

Embodiments relate to methods and devices for display devices and methods for display and control.

Background of the Related Art

Information technology equipment includes, for example, desktop computers, laptops or notebooks as well as mobile phones, in particular so-called smartphones, tablet computers and reading devices for displaying documents, MP3 players, remote controls with displays, portable video or DVD players, etc. Such information technology equipment, referred to in short as IT equipment below, more and more frequently features a so-called touchscreen, that is, a display device for information elements, in particular lists, texts, websites, that is touch-sensitive and can therefore be used by a user for controlling the display device. Increasingly so-called swipe motions or swipe gestures are used and serve as control motions. Such swipe gestures are, for example, vertical scrolling through lists or horizontal scrolling between different views in an image gallery, for example. The swipe gestures are often motions of the hand or finger of a user of such equipment. Since the display devices of such equipment is limited in size, only a certain amount of vertical or horizontal scrolling is possible in order to achieve a certain minimum precision for each carried out swipe gesture. Since paging is thus limited, several movements—or even movements in such a high amount that is perceived as unacceptable—are necessary in case of longer lists/texts/web pages. This problem occurs in particular with longer texts or lists if one had scrolled already far down and then needs to return to the top (or vice versa).

It is further known to take the speed of the swipe gestures into account in order to accelerate scrolling in longer lists. However, this decreases the accuracy of the scrolling process because stopping it cannot be influenced directly. Plus, as a rule, several actions or gestures are required.

It is also known to provide a separate scrollbar as an alternative for scrolling. However, the disadvantage of this is the loss of space for the actual objective, namely the presentation of information, due to the obviously limited area on the display device. Also providing a special control field in the graphical user interface for jumping to the top or the end "uses up" valuable useable space for presenting information.

EP2 472 380 A2 teaches to simplify scrolling of long objects through a circular swipe gesture. The scroll speed can be determined, for example, by the speed of the swipe gesture or the radius of the rotational movement, while the scroll direction is determined by a prior linear swipe gesture. After an initial linear swipe gesture that defines the direction, it is then sufficient to complete this gesture to a full 360° rotation in order to return to the top or the end of the object, respectively. Many users find such a complex swiping motion for moving to the end or the top of the document not very intuitive.

Known from "dsource.in/course/touch-screen-gestures/gestures-of-touch-screen/index.html" is a similar technical teaching; however, here, the scroll direction is defined by the rotational direction of the swipe gesture. This application relates not only to touchscreens but can also be used for so-called circular track pads.

With the touch control known from US 2009/0278806 A1, a touch-sensitive (or at least user gestures recognizing) gesture area is present on the device surface in addition to the display and can be used (or used additionally) for entering commands. This gesture area (touch-sensitive area) is larger than the display. Areas located outside of the display can be used for entering gestures and are independent of the currently presented elements. Among other things, the gesture area can be used to modify a command that has been activated via the display such as "scrolling" (for example to "jump scrolling").

Several options for controlling the scroll speed internally after an initial swipe gesture are described for the scroll method according to WO 2010/060584 A1. For example, a fast film-like paging can be initiated that may continue to run without interruption if needed until the beginning or the end of a list is reached.

Known from "microsoft.com/surface/de-de/support/touch-mouse-and-search/using-touch-gestures-tap-swipe-and-beyond" is the insertion or activation of various menu options by swiping inward from the display edge.

None of the aforementioned options for reaching the beginning or end of a list or a document appear simple enough and intuitively accessible for daily use.

BRIEF SUMMARY OF THE INVENTION

The problem addressed by the current invention is, therefore, to provide an intuitive control motion, in particular a swipe gesture, that can be used to scroll to the beginning or the end of an information element—such as in particular lists/texts/web pages—without the use of multiple movements and without the necessity for a separate control field.

Embodiments relate to computer program products for a respective control device of a piece of information technology equipment that executes this method, a data carrier with a computer program product stored on it and a piece of information technology equipment with a control device that is designed for the execution of the aforementioned method. Finally, embodiments of the present invention relate to the use of a control device for controlling the display device of a piece of information technology equipment.

BRIEF DESCRIPTION OF THE FIGURES

The invention is described in greater detail below, based on advantageous embodiments with reference to the drawing. The figures show schematically.

LIST OF REFERENCE CHARACTERS

Figure 1:
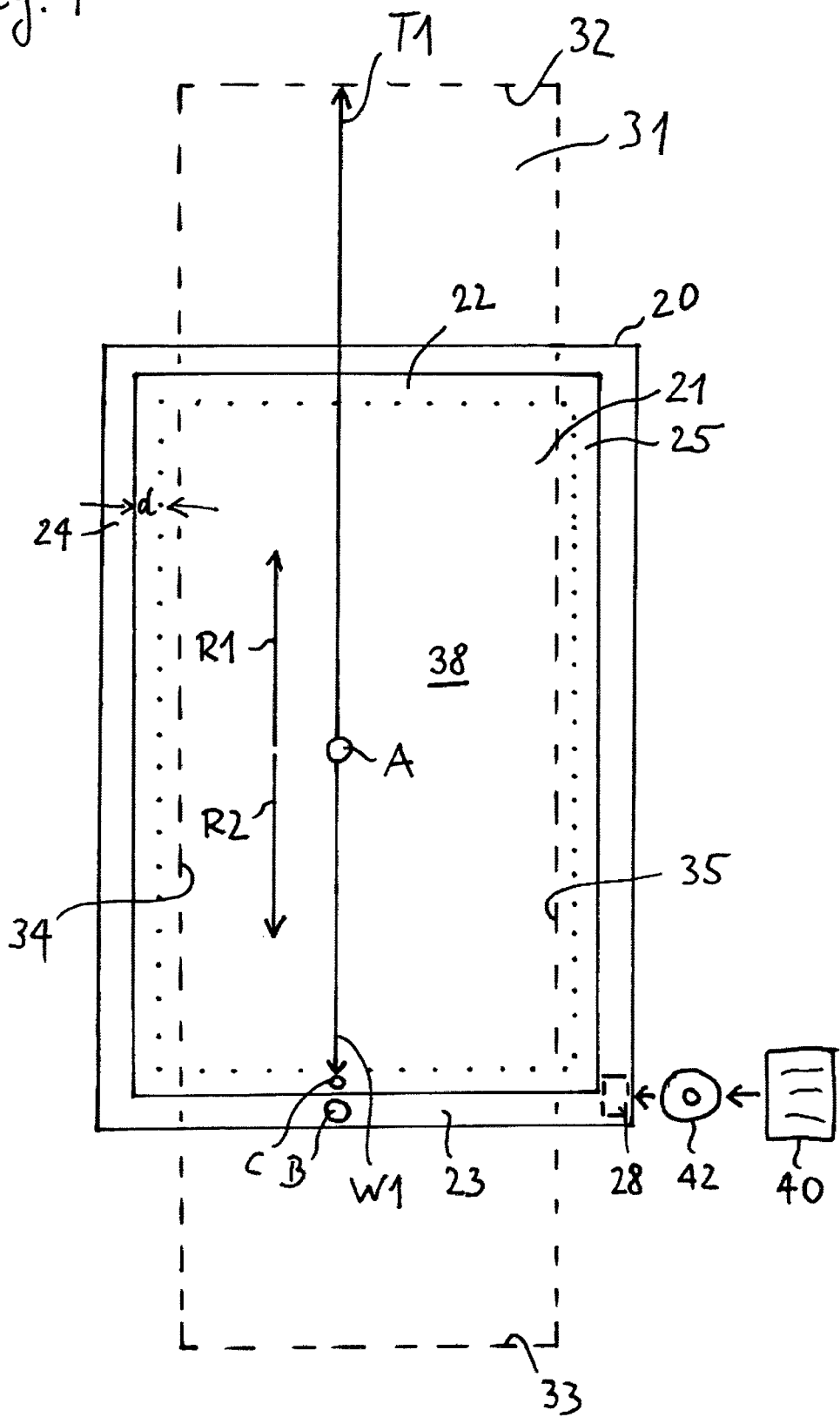
FIG. 1 A top view of a display device, for example a smartphone, in a first display situation, FIG. 2 A presentation of the display device similar to FIG. 1 in a second display situation, FIG. 3 A presentation of the display device similar to FIG. 1 in a third display situation, FIG. 4 A presentation of the display device similar to FIG. 1 in a fourth display situation, FIG. 5 A presentation of the display device similar to FIG. 1 in a fifth display situation, and FIG. 6 A presentation of the display device similar to FIG. 1 in a sixth display situation.

20=Piece of information technology equipment
21=Display device/touchscreen
22=First/upper edge of display device 21
23=Second/lower edge of display device 21
24=Left edge of display device 21
25=Right edge of display device 21
28=Control device/chip
31=Information element
32=First/upper edge of information element 31
33=Second/lower edge of information element 31
34=Left edge of information element 31
35=Right edge of information element 31
38=Presented section
39=First edge section
40=Computer program
42=Data carrier
d=Width of the edge
A=Starting point of the control motion
B=End point of the control motion
C=Last contact point on the display device 21
R1, R2=First/second direction
T1, T2=Translation
W1, W2=Control motion/swipe gesture

DETAILED DESCRIPTION OF THE INVENTION

The term "display device" refers to a display device in its most general form for displaying image information. Such display devices are also referred to as screens or displays and can be manufactured using various technologies, for example using LCDs, LEDs or OLEDs. Such display devices are in particular touch-sensitive and thus designed as so-called touchscreens such that a user can use such a display device also as an input device by touching or pressing on the display device with a stylus, a finger or even several fingers on at least one position or by sliding the finger or the stylus across the display device, which is also referred to as a swiping gesture.

Using one method according to the invention, a display device can be controlled such that a first edge section of a region of the information element, of which a certain first edge is not presented, presented on the display device is being displayed and comprises this first edge of the information element and the first edge of the adjacent region of the information element. In other words, this means that in any information element, a desired edge can be presented on the display device. Conceivable as information elements are, for example, texts, documents, lists of objects, galleries, for example of images, or the like. The display device can be a display of a piece of equipment, in particular of information technology equipment, for example.

The method according to the invention comprises the step of executing a more or less linear motion ("translation") of the presented section of the information element in a first direction (for example upward) depending on the control motion executed by a user in a second direction (in this example, downward), wherein the translation triggers a control signal that is supplied to a control device such as a CPU. Thus, the method according to the invention is characterized in that a second control signal is generated and transmitted to the control device as soon as the control motion has reached the second edge of the display device which is reached with the help of the motion in the second direction. Finally, after having received the first and second control signals, the control device jumps—i.e., discontinuously and not like a "normal" or "accelerated" scrolling process—to present the first edge section of the information element on the display device reached through the motion in the first direction.

The first control signal is typically of a vector-like magnitude, providing at least the direction of the triggered translation and also, if applicable, at least a preliminary value for the length of the translation.

The control motion mentioned above may be swiping with a thumb or finger or a pointer device across a touch surface but can also be "dragging" a mouse across a conventional screen.

Through the method according to the invention, which can also be referred to as a "computer-implemented method" that can be executed using a CPU or another control unit, a user can jump to any desired end of an information element, i.e., the left, right, top or bottom end of this information element, from any desired section of an information element presented on the display device through a simple, intuitive and quick control motion.

According to one preferred embodiment of the method according to the invention, the edge of the display device is a strip of a pre-specified width. This means in other words that the control device does not need to register the control movement exactly to the edge of the display device (for example, a touchscreen) in order to determine whether the control motion has indeed been carried out to the edge of the display device and therefore a "jump command" to the respective end of the currently displayed information element is to be executed. One can also say that a strip of the pre-specified width is perceived by the control device as the edge or edge region such that the "jump command" is not activated at an earlier stage of the control motion but rather that the certainty of recognizing the presence of such a jump command is improved as well. It is conceivable that the user can alter the pre-specified width within a certain range in order to adapt the functionality of the device operated by him to his requirements. For example, for users who as a rule operate a touch screen with the thumb on a relatively large area, it may be more convenient and efficient to select a relatively large pre-specified width, while users who operate their device with the tip of a potentially petite finger may manage better with a relatively narrow pre-specified width.

According to an advantageous variation of the method according to the invention, the translation of the presented section of the information element progresses after the start of the control motion that had triggered the translation in proportion to this control motion, until such time as the control motion has reached the respective edge, or the second edge, respectively, of the display device. By this, the user has the advantage that the familiar functionality of his display device is executed for the "start" of the control motion in familiar fashion and that the jump to the desired end of the information element, as currently presented on the display device, occurs only when the edge is reached, even if a control motion has been performed extremely fast in order to achieve precisely this jump effect as quickly as possible. This process lends itself in particular to the use of a touchscreen. When controlling a display using a pointer device such as a computer mouse, for example, when text is to be click-selected and dragged up or down, this proportional translation is not necessarily advantageous, because it may not even be executable in this manner, for example, with Word documents, wherein a jump to the desired end of the document can be triggered as well when the respective edge is reached.

It is advantageous if the control device displays the first edge section, i.e., after jumping to the respective edge, such that the first edge of the information element is located adjacent to the first edge of the display device. In other words, this means that space provided on the display device for presenting the information element is utilized optimally by presenting not only the edge of the information element but also as much as possible of its surroundings. Naturally, it is also possible to control the method according to the invention such that the controlled first edge of the information element is displayed at a different location of the display device, for example, in the center, in order to present other information in the space of the display device not claimed by the information element.

It corresponds to the typical usage mode of a touchscreen if the first direction in which the translation of the display of the information element is executed is at least essentially anti-parallel to the second direction in which the control motion occurs. Because only the vertical motion component from a control movement executed at an angle is taken into account for the translation when navigating within a list, for example downward, it is clear that the first direction does not have to be exactly anti-parallel to the second direction, rather that this relation must be met only approximately. In other words, the respective motion components that are decisive for the direction of the control motion or the resulting translation must be opposite of each other. Of course, the same applies to motions in a horizontal direction, for example, when paging through an image gallery.

One advantageous option for avoiding an unintended execution of a jump command is to measure the speed of the control motion in the immediate vicinity of the display device's edge—whether a strip designed with a predefined width or defined or not—and to consider having reached the edge of the display device only when the speed exceeds a pre-specified value. In other words, the edge is considered having been reached only when the control motion arrives at the edge with a certain speed. If a user intends to utilize the space available to him to the maximum when scrolling or paging, he could risk jumping to the edge of the presented information element unintentionally, if his control motion that was only intended for scrolling, reaches too close to the edge with. On the other hand, if a certain minimum speed is also required in the immediate vicinity of the edge, for example, a distance of half a finger or thumb width, in order to execute the jump command, then an unintended jump to the edge of the information element is prohibited if the edge of the display device is (almost) reached but at such a slow speed that the control device recognizes that a jump is not intended. For the purpose of this invention, a suitable limit value for the speed is 1 m/s, for example.

A particularly interesting case of applying the present invention is provided when using IT equipment with a touch-sensitive screen—also referred to as a touchscreen. On such a touchscreen, the control motions are carried out as swiping motions or swiping gestures, for example by using a finger and/or a thumb or also by using a pointer device.

The problem addressed by the invention is also solved by a computer program product or by a computer program that controls a control device of information technology equipment in order to execute a method according to the present invention. In addition, the problem addressed by the invention can also be solved using a data carrier on which an aforementioned computer program product is stored and can be used to execute this computer program.

Furthermore, the problem addressed by the invention is solved by using information technology equipment that includes a display device and a control device that is provided to control the display device and is equipped such that it can control the display device pursuant to the method according to the invention. A particularly advantageous embodiment of such information technology equipment is characterized in that the display device has a touchscreen.

The use of a control device for controlling the display device of a piece of information technology equipment pursuant to a method according to the invention is also considered a part of the present invention.

The advantages, features and particularities of the various versions of the method according to the invention also apply in analogous fashion to the computer program product, the data carrier, the information technology equipment, and the use of the control device pursuant to the present invention without the need to have this described again.

The present invention can also be employed very well for a display device that can be controlled using optical recognition of control motions. Such optical recognition can be carried out, for example, by using one or more cameras that sense control or swiping motions and transfer them to the control device. Such cameras can also sense head or eye motions, for example, which can be used to control the display device as well.

FIG. 1 shows a piece of information technology equipment 20. The description of advantageous embodiments of the invention below assumes that the information technology equipment 20 is a smartphone with a touchscreen serving as the display device 21 that can be influenced using the finger (and possibly the thumb) of a user. Of course, specially designed styluses or other objects can be used instead of fingers. Alternatively, it is also possible that the display device 21 is a "regular" monitor—for example of a notebook or desktop computer—where the presentation can be influenced by a mouse pointer using a held-down left or right mouse button.

Below, directional information such as "left," "right," "up," and "down" refers to spatial orientation with regard to the presentation in the figures in the drawing plane and shall not constitute any restrictions. If images are presented in portrait format, it means that their long side expands from top to bottom, while the long side of images presented in landscape format expands from left to right. Of course, there is no difference between "from left to right" and "from right to left" as well as "from top to bottom" and from "bottom to top", etc. in the aforementioned directions of expansion. In addition, it is assumed that the term "image height" refers to the direction from top to bottom while "image width" refers to the direction from left to right.

Finally, a control device 28 is indicated schematically in FIG. 1 at the bottom right corner, which is typically a processor or a chip and is designed to control the display device 21, or preferably the entire piece of information technology equipment 20. A computer program or a computer program product 40 is used to control the control device 28 and is stored on a data carrier presented in exemplary fashion as a CD-ROM 42 and can be read into the control device 28 via a suitable interface or an appropriate reading device and can be executed there.

According to the presentation in FIG. 1, an information element is presented on the display device 21 using dashed lines and is designated in its entirety by 31. The section of the information element 31 that is actually presented on the display device 21 is designated by the reference number 38. In other words, this means that the upper edge 32 and the lower edge 33 of the information element 31 are not presented on the information device 21, while the left edge 34 and the right edge 35 of the information element 31 are presented on the information device 21. To present portions of the information element 31 that are located further up, a user can touch touchscreen 21 at a starting point of a swipe gesture designated with A, using a finger, for example, and move the finger in a downward direction R2. Touchscreens are usually designed such that the currently displayed section of the information element 31 moves down in the direction R2 together with the finger, which therefore moves the presented section 38 of the information element 31 effectively upward correspondingly in the direction R1. If the user continues his control motion (swipe gesture) referenced by W1 so far down in the direction R2 until he has reached or gone beyond the lower edge 23 of the display device 21, then the method according to the invention is designed such that the control device 28 carries out a jump such that the presented section 38 of the information element 31 also includes the upper edge 32 of the information element 31, which can be referred to as the first edge section 39, as presented in FIG. 1. This situation is presented in FIG. 2, wherein the upper edge 32 of the information element 31 is close to the upper edge 22 of the display device 21.

According to one variation of the present invention, the jump to the upper edge 32 of the information element 31 described above is executed when the end point B of the control motion W1 reaches the lower edge 23 of the display device 21, or has gone beyond it as explicitly presented in FIG. 1, such that it is located on the portion of the information technology equipment 20 that is no longer part of the display device 21. Alternatively, the method according to the invention can also be designed such that it is sufficient if the last contact point C of the display device 21 is located within a certain strip with a width d from the respective edge of the display device 21—in this example from the lower edge 23. The width d of this edge is 3-5 mm, for example. As is evident from FIG. 1, a translation T1 with regard to the presented section 38 of the information element 31, which is significantly bigger or longer than the length of the swipe or control motion W1, is carried out through the jump to the upper end 32 of the information element 31.

The display device 21 has an upper edge 22, a lower edge 23, a left edge 24 and a right edge 25, each having a width or extension d as presented for the left edge 24. Because the aforementioned edges 22-25 cannot be recognized as such by an observer, these edges are presented only in dotted form.

Technically speaking, the method according to the invention is to proceed such that at least a first control signal is generated and submitted to the control device 21 as soon as a control motion is performed, which initiates a translation. Furthermore, a second control signal is generated as soon as the control motion has reached the edge (here, the second, lower edge 23) of the display device 21, which is the result of the motion in the second direction R2, regardless if by a control motion beyond the respective edge of the display device 21 or by reaching the respective edge (with the width d) of the display device. Of course, additional control signals can be generated and assessed by the control device without affecting the basic functionality of the method according to the invention.

Figure 2:
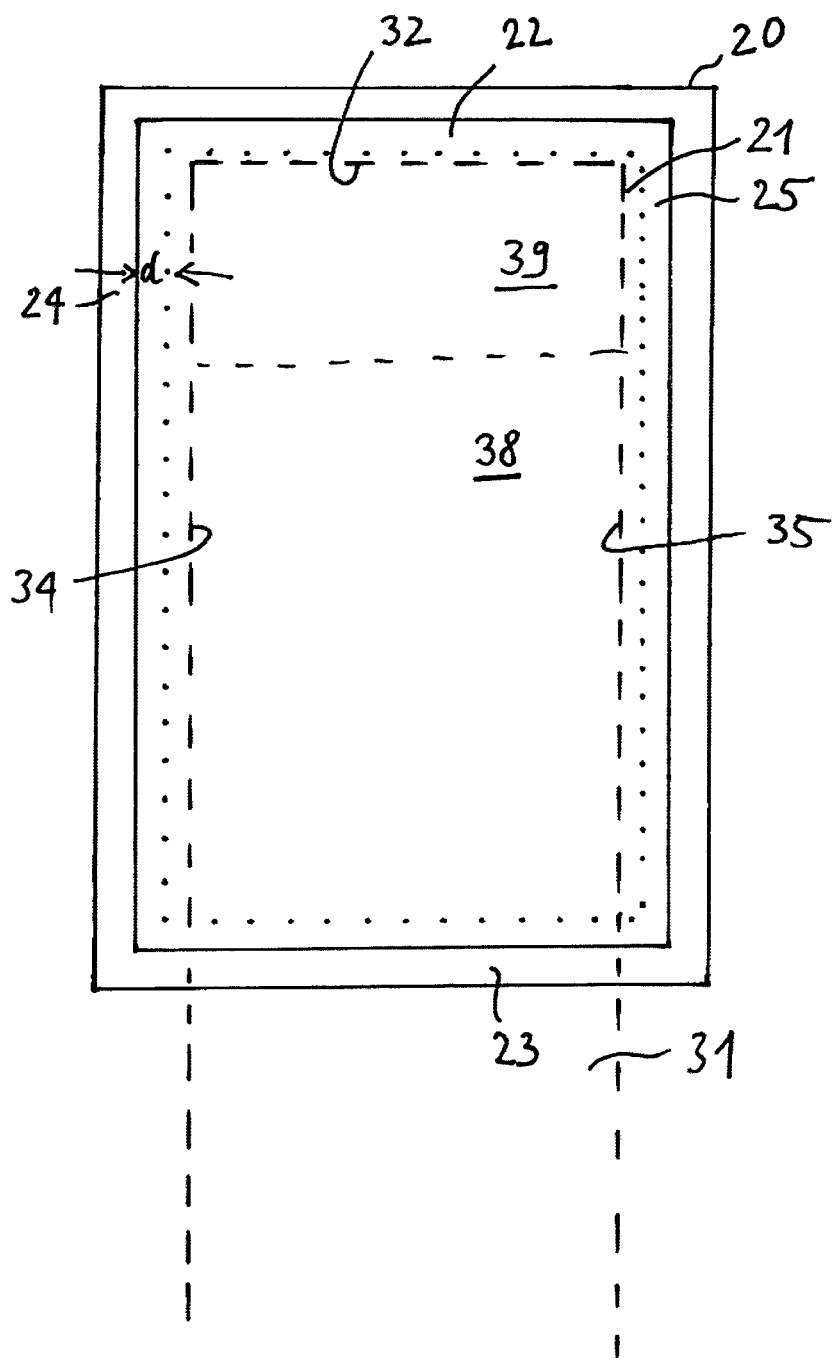

Obviously, a design with the steps explained in connection with FIGS. 1 and 2 can achieve a jump in the respective opposite direction of the presented section 38 of the information element 31 to its second, lower edge 33. In this case, the swipe gesture is carried out, starting at point A for example, upward and continues until it reaches the upper (first) edge 22 of the display device 21, such that the resultant translation of the presented section 38 is downward. The display situation achieved in this case is presented in FIG. 3.

Figure 3:
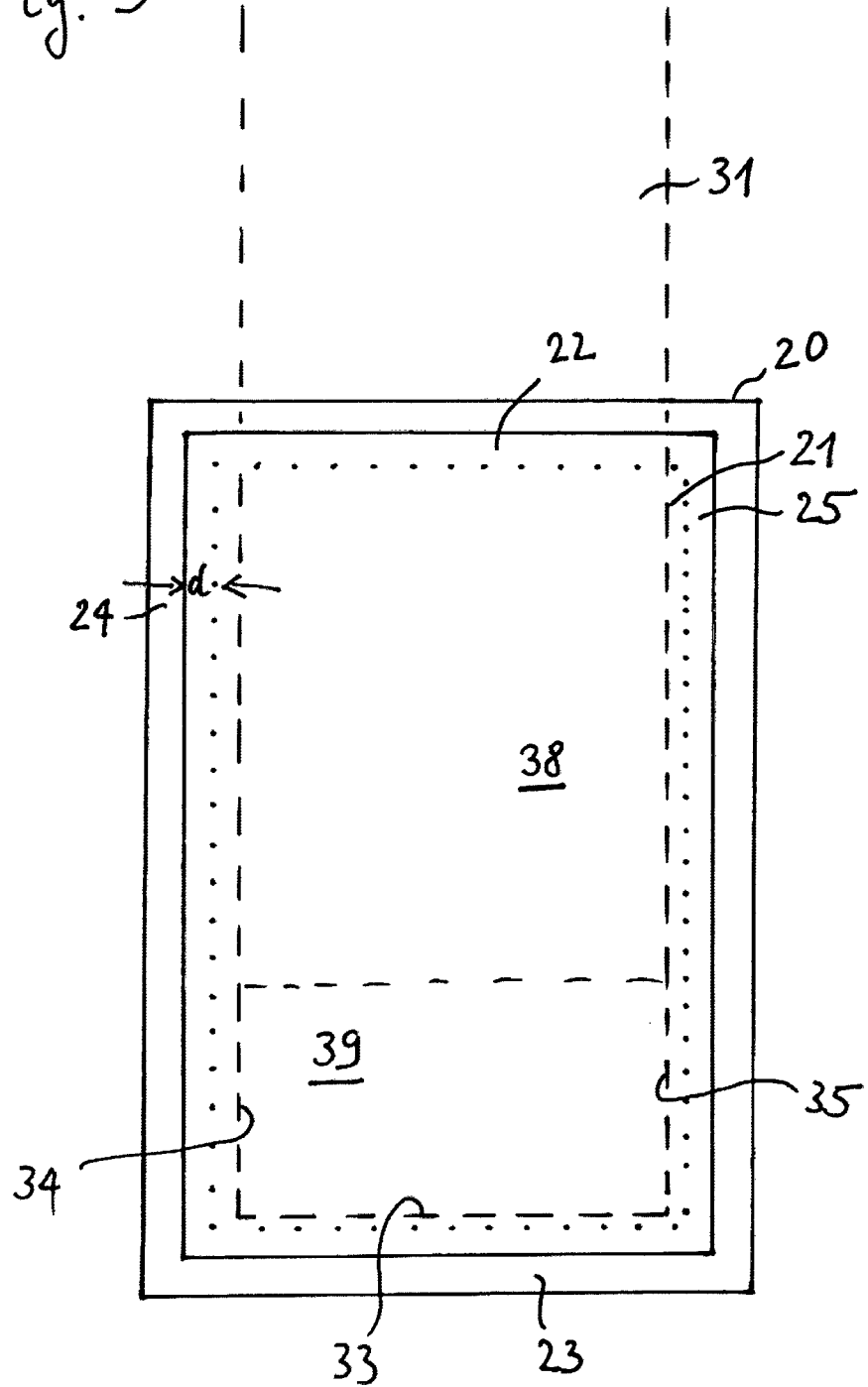
Figure 4:
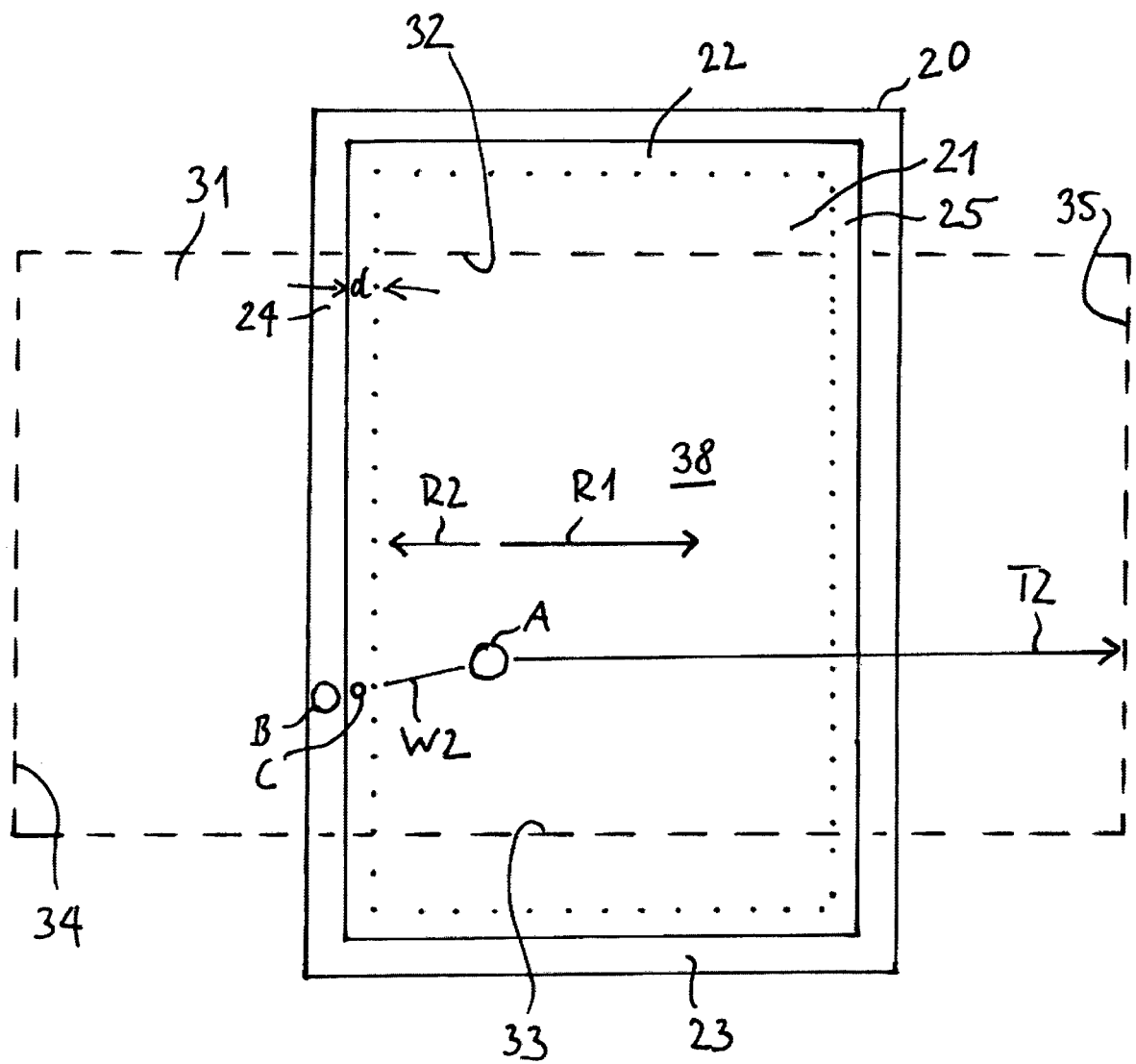
Figure 5:
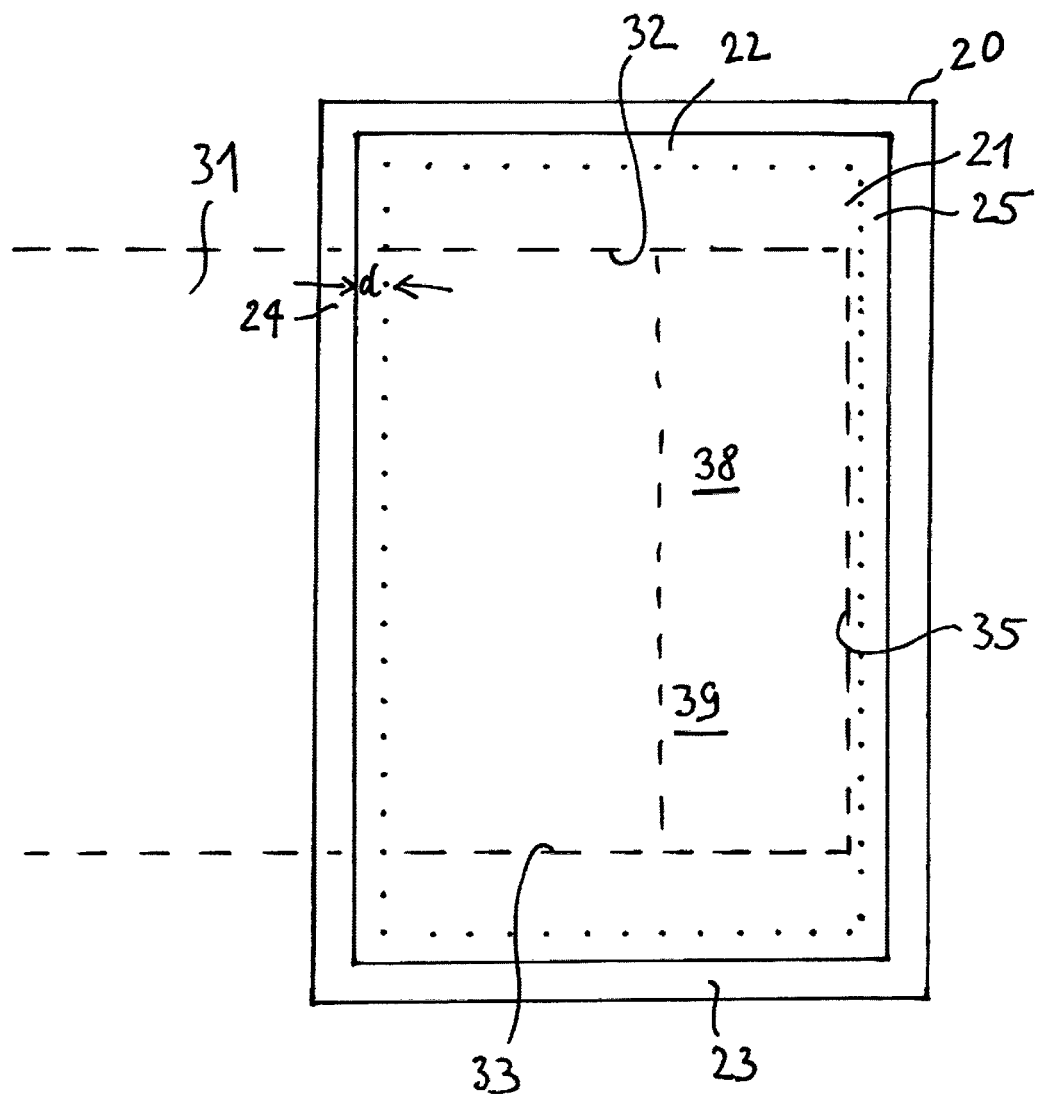

Similarly, according to FIG. 4, the method according to the invention can also be used to reach the left end 34 or the right end 35 of an information element 31, which may be an image gallery with various images. Different from the situation presented in FIG. 1, both the upper edge 32 and the lower edge 33 of the information element 31 are presented on the display element 21 according to the display situation presented in FIG. 4, but not its left edge 34 and its right edge 35. By tapping point A with a finger and dragging this finger to the left edge 24 of the display device 21—either to point B outside the display device 21 or to the last contact point C inside the left edge 24 of the width d—a jump to the right edge 35 of the information element 31 is carried out such that the right edge 35 of the information element 31 is located close to the right edge 25 of the display device 21. As is the case for vertical scrolling as described with reference to FIGS. 1-3, a first control signal and a second control signal are generated in a similar fashion with this horizontal scrolling and are provided to the control device 28 such that this control device can execute the jump of the presented section 38 of the information element 31. The display situation after carrying out the jump is presented in FIG. 5. The translation T2 thus corresponds to the control motion W2.

Figure 6:
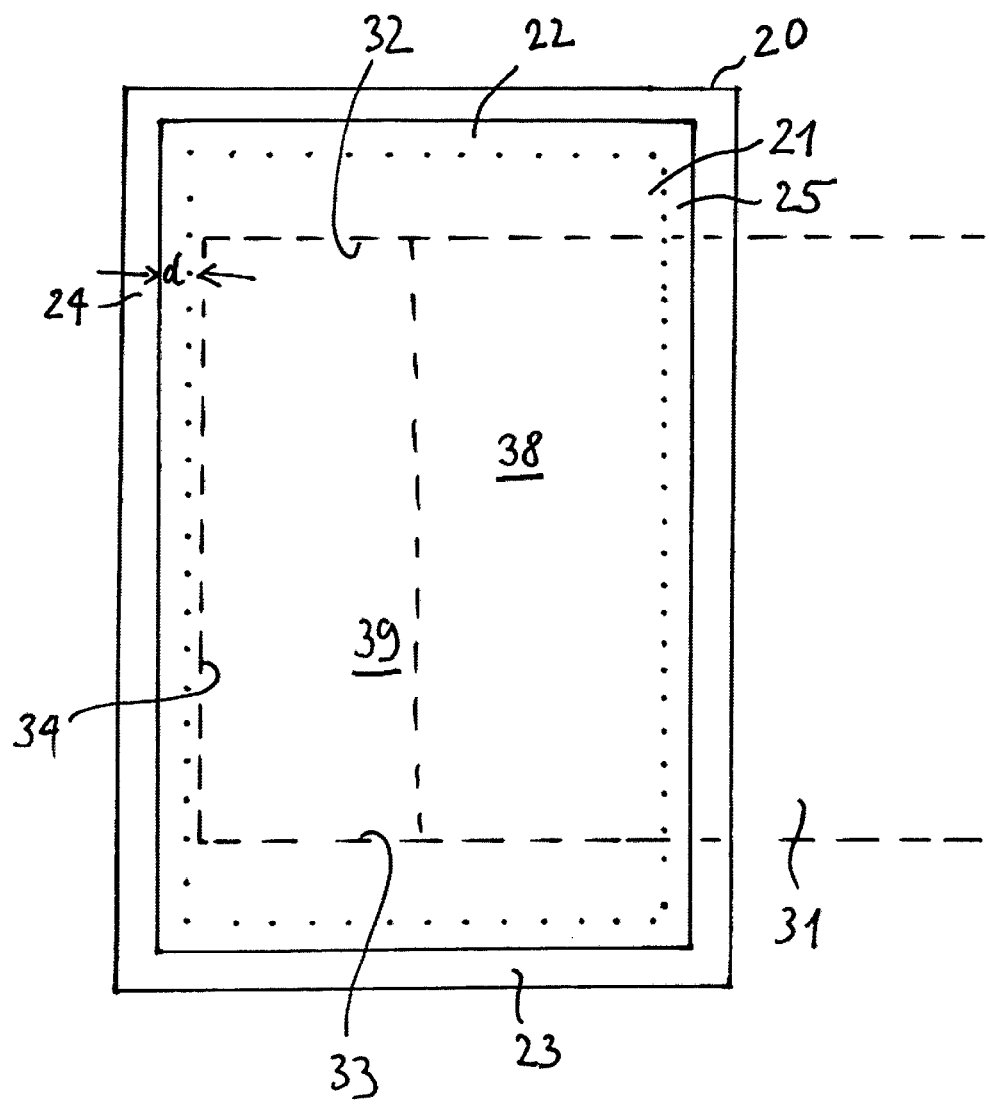

If the control motion W2 executed with reference to FIGS. 3 and 4 is carried out in the opposite direction, then the translation T2 is also carried out in the opposite direction and the left edge 34 of the information element 31 is reached, such that the presented section 38 of the information element 31 is located close to the left edge 24 of the display device 21. This display situation is presented in FIG. 6.

For the control motions W1 and W2 described above, it is assumed that they move more or less exactly in a vertical or horizontal direction, i.e., along the side edges of the display device 21. Similarly, it is assumed that the corresponding translations T1 and T2 behave exactly opposite or antiparallel to these control motions W1 or W2. It can be assumed that the control device 28 registers only the respective horizontal or vertical component of a control motion, depending on the direction in which a translation is actually possible. This embodiment of the method according to the invention is of particular advantage if the information element 31 can scroll only upward and downward (example: list or text document) or only left and right (example: image gallery or individual months of a calendar).

However, if the information element 31 is designed such that scrolling in all 4 directions of the compass or even in any desired direction is possible, which is the case with a zoomed image, for example, the method according to the invention can be designed such that the jump is carried out at that point at the edge of the information element that corresponds to an extension of the control motion in the "angular" direction at the arrival at the respective edge of the display device.

It should be noted that the features of the invention described by referencing the presented embodiments, for example, shape, design or arrangement of individual elements of the information technology equipment or of the execution of individual details of the method according to the invention, can be present in other embodiments as well unless stated otherwise or prohibited for technical reasons.

I claim:

1. A method for controlling a display device that displays an information element, the information element having a first edge and a second edge opposite the first edge of the information element, the information element configured to be displayed as extending in a second direction from the first edge of the information element to the second edge of the information element, the display device having a first edge and a second edge opposite the first edge of the display device, the display device extending in the second direction from the first edge of the display device to the second edge of the display device, a first direction being a direction that is opposite the second direction, the method comprising:
   generating a first control signal for sending to a control device of the display device in response to detection of a control motion moving in the first direction toward the first edge of the display device for effecting a translation of an information element displayed on the display device for displaying an undisplayed intermediate section of the information element that is between a currently displayed portion of the information element and the second edge of the information element;
   generating a second control signal in response to detection of (i) the control motion reaching a pre-defined position adjacent to the first edge of the display device after the first control signal was generated during continuous motion of the control motion in the first direction and (ii) the control motion being at a pre-selected speed and supplying the generated second control signal to the control device when the control motion is detected as having reached the pre-defined position at the speed that is at least the pre-selected speed; and
   the control device, after receiving the first control signal and the second control signal, causing the display device to jump a display of the information element so that the display device displays the second edge of the information element on the display device without displaying scrolling through of the intermediate portion of the information element between the currently displayed portion of the information element and the second edge of the information element; and
   the control device comprising a processor.

2. The method of claim 1, wherein the first edge of the display device is a strip at an edge of a screen of the display device that has a pre-specified width.

3. The method of claim 1, wherein the translation progresses proportionally to the speed of the control motion until the control motion reaches the first edge of the display device.

4. The method of claim 1, wherein the first edge of the information element is located adjacent to the first edge of the display device after the jump of the display of the information element occurs.

5. The method of claim 1, wherein the first direction is at least essentially anti-parallel to the second direction.

6. The method of claim 1, comprising:
   measuring the speed of the control motion in proximity to the first edge of the display device; and
   wherein the pre-defined position adjacent to the first edge of the display device is considered as having been reached in response to the measured speed exceeding the pre-selected speed, the pre-selected speed being a pre-specified value.

7. The method of claim 1, wherein the display device is a touchscreen and wherein a swiping motion is performed as the control motion using at least one of a finger, a thumb, and a pointer device.

8. A non-transitory computer readable medium having a program stored thereon that defines a method so that, when the program is executed by at least one processor, the method of claim 1 is performed.

9. The non-transitory computer readable medium of claim 8, wherein the non-transitory computer readable medium is included in information technology equipment, a smartphone, a laptop computer, a desktop computer, a tablet computer, or a computer device.

10. The method of claim 1, wherein the first edge of the display device is a top edge and the second edge of the display device is a bottom edge and the first edge of the information element is a top edge of the information element and the second edge of the information element is a bottom edge of the information element.

11. The method of claim 1, wherein the first edge of the display device is a right side edge and the second edge of the display device is a left side edge and the first edge of the information element is a right side edge of the information element and the second edge of the information element is a left side edge of the information element.

12. A piece of information technology equipment, comprising
   a display device configured to display an information element, the information element having a first edge and a second edge opposite the first edge of the information element, the information element configured to be displayed as extending in a second direction from the first edge of the information element to the second edge of the information element, the display device having a first edge and a second edge opposite the first edge of the display device, the display device extending in the second direction from the first edge of the display device to the second edge of the display device, a first direction being a direction that is opposite the second direction, and
   a control device for controlling the display device, the control device comprising a processor;
   the piece of information technology equipment being configured to:
      generate a first control signal in response to detection of a control motion moving in the first direction toward the first edge of the display device for effecting a translation of the information element displayed on the display device for displaying an undisplayed intermediate section of the information element that is between a currently displayed portion of the information element and the second edge of the information element,
      generate a second control signal in response to detection of the control motion reaching a pre-defined position adjacent to the first edge of the display device after the first control signal was generated during continuous motion of the control motion in the first direction and the control motion being at a pre-selected speed; and
   the control device configured to cause the display device to jump a display of the information element so that the display device displays the second edge of the information element on the display device without displaying scrolling through of the intermediate portion of the information element between the currently displayed portion of the information element and the second edge of the information element in response to receiving the first control signal and the second control signal.

13. The piece of information technology equipment of claim 12, wherein the display device includes a touchscreen.

14. The piece of information technology equipment of claim 12, wherein the first edge of the display device is defined as a strip on a screen of the display device that is at an edge of the screen and has a pre-specified width.

15. The piece of information technology equipment of claim 12, the piece of information technology equipment being a computer, a laptop, a smartphone, or a table computer.

16. The piece of information technology equipment of claim 12, wherein the piece of information technology equipment is configured so that the translation progresses proportionally to the speed of the control motion until the control motion reaches the first edge of the display device.

17. The piece of information technology equipment of claim 12, wherein the first edge of the information element is located adjacent to the first edge of the display device after the jump of the display of the information element occurs.

18. The piece of information technology equipment of claim 12, wherein:

the piece of information technology equipment is configured to measure the speed of the control motion in proximity to the first edge of the display device; and the pre-defined position adjacent to the first edge of the display device is considered as having been reached in response to the measured speed exceeding the pre-selected speed, the pre-selected speed being a pre-specified value.

19. The piece of information technology equipment of claim 12, wherein:

the first edge of the display device is a top edge and the second edge of the display device is a bottom edge; and the first edge of the information element is a top edge and the second edge of the information element is a bottom edge.

20. The piece of information technology equipment of claim 12, wherein the first edge of the display device is a right side edge and the second edge of the display device is a left side edge and the first edge of the information element is a right side edge of the information element and the second edge of the information element is a left side edge of the information element.

* * * * *